A. P. KOCHENDORFER.
HARROW ATTACHMENT.
APPLICATION FILED OCT. 5, 1916.

1,248,673.

Patented Dec. 4, 1917.

INVENTOR,
A. P. Kochendorfer.
BY HIS ATTORNEY.
A. M. Carlsen.

UNITED STATES PATENT OFFICE.

ALFRED P. KOCHENDORFER, OF SOUTH PARK, MINNESOTA.

HARROW ATTACHMENT.

1,248,673.   Specification of Letters Patent.   Patented Dec. 4, 1917.

Application filed October 5, 1916. Serial No. 123,865.

*To all whom it may concern:*

Be it known that I, ALFRED P. KOCHENDORFER, a citizen of the United States, residing at South Park, in the county of Dakota and State of Minnesota, have invented a new and useful Harrow Attachment, of which the following is a specification.

My invention relates to attachments for harrows, and the object is to provide simple means by which the harrow can be quickly and easily lifted off of its teeth and onto wheels or rollers so as to facilitate the moving of the harrow from place to place without having it dragging on the ground. It will also discharge any weeds or rubbish which have accumulated on the teeth.

Figure 1:
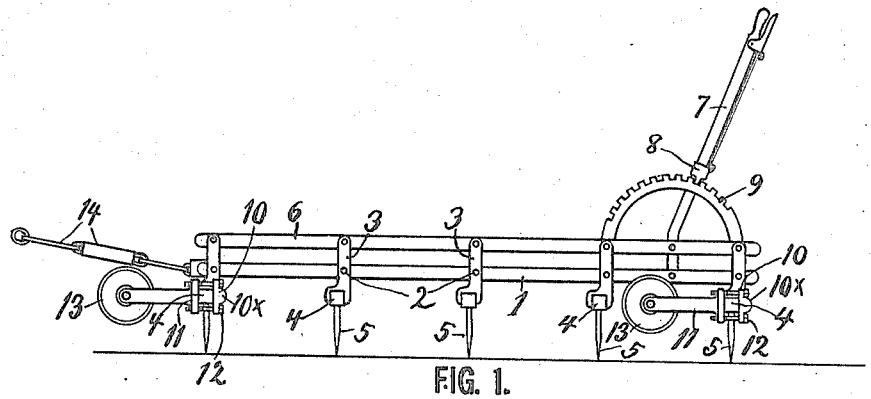
Figure 2:
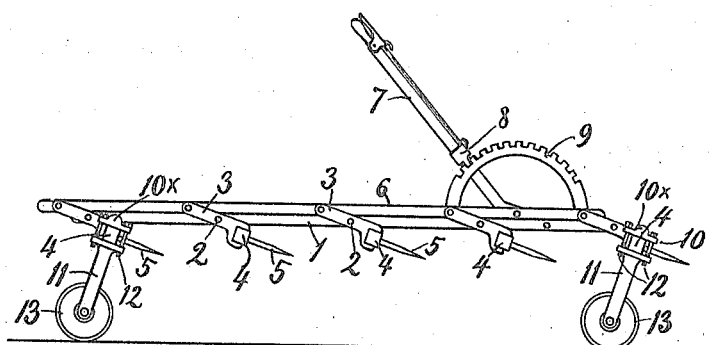
Figure 3:
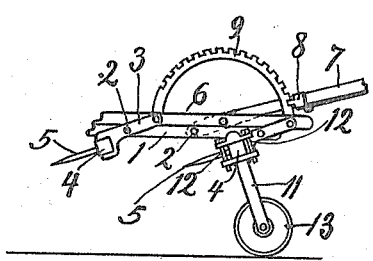
Figure 4:
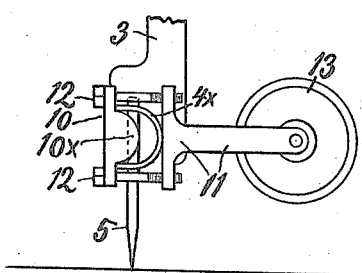

The invention is illustrated in the accompanying drawing, in which:

Figure 1 is a left side view of a harrow resting on its teeth, which teeth are in the position they assume while harrowing the ground. My invention is shown attached to the harrow, but in idle position. Fig. 2 is another left side view of the harrow but showing the teeth in idle position and the harrow resting on small wheels. Fig. 3 is a portion of Fig. 2 but showing the teeth and a roller in different positions. Fig. 4 is one corner of the harrow enlarged and showing a different form of tooth bar.

Referring to the drawing by reference numerals, 1 designates the longitudinal bars of the frame of a common harrow, usually a four cornered structure. To said frame are pivoted at 2, series of short levers 3, to which the cross bars 4 carrying the harrow teeth 5 are secured. The upper ends of the levers in each series are connected together by a rod 6, and to the latter bar and to one of the longitudinal frame bars is pivoted a hand lever 7 having a dog 8 arranged for engagement with a toothed sector 9 fixed on the frame.

My attachment consists of four clamps 45 adapted to be secured upon the outer ends of the front and rear cross bars 4, each clamp consisting of two members 10 and 11, drawn tightly against opposite sides of the bar by bolts or screws 12; the clamp member has at its middle a half-moon shaped portion $10^\times$ which when the tooth bar is of semicylindrical form, as $4^\times$ in Fig. 4, is turned toward the bar. The other clamp member 11 may be forked for a wheel 13 which is journaled to it and serves to support the harrow whenever the teeth are turned or swung away from the ground. Such swinging may be forwardly as in Fig. 3 or preferably rearwardly as in the other views.

In Fig. 1, 14 designates a draft appliance for drawing the harrow.

It will thus be understood that in operation, the wheels will support the harrow automatically as the teeth are turned more or less away from the ground.

What I claim is:

In a harrow, the combination with a harrow frame having transverse bars holding the teeth of the harrow and having a turning movement for swinging the teeth to and from the ground and means for so turning the bars, of brackets securable to some of the tooth holding bars, and wheels mounted on the brackets to support the harrow when its teeth are swung away from the ground, said brackets being detachably secured to the bar, by having clamping members and bolts drawing said members tightly to opposite sides of the bar, one member of each clamp being reversible with either side toward the tooth bar, and having upon one side an embossment adapted to enter into the grooved side of the bar when the latter is made of channel iron.

In testimony whereof I affix my signature.

ALFRED P. KOCHENDORFER.

Copies of this patent may be obtained for five cents each, by addressing the "Commissioner of Patents, Washington, D. C."